United States Patent [19]
Petrovich et al.

[11] Patent Number: 6,101,483
[45] Date of Patent: Aug. 8, 2000

[54] PERSONAL SHOPPING SYSTEM PORTABLE TERMINAL

[75] Inventors: Adam Petrovich, Pittsburgh, Pa.; Thomas K. Roslak, Eastport, N.Y.; Jerome Swartz, Old Field, N.Y.; Raj Bridgelall, Ronkonkoma, N.Y.

[73] Assignee: Symbol Technologies, Inc., Holtsville, N.Y.

[21] Appl. No.: 09/087,086

[22] Filed: May 29, 1998

[51] Int. Cl.⁷ .................................................. G06F 17/60
[52] U.S. Cl. ............................................... 705/26; 705/26
[58] Field of Search ......................... 705/26, 8, 1; 710/7, 710/101; 708/105; 379/93.12; 340/825.3; 235/472.01

[56] References Cited

U.S. PATENT DOCUMENTS

| | | | |
|---|---|---|---|
| 5,047,614 | 9/1991 | Bianco | 235/385 |
| 5,287,266 | 2/1994 | Malec et al. | 705/1 |
| 5,295,064 | 3/1994 | Malec et al. | 705/1 |
| 5,389,917 | 2/1995 | LaManna et al. | 340/825.3 |
| 5,424,524 | 6/1995 | Ruppert et al. | 705/8 |
| 5,468,942 | 11/1995 | Oosterveen et al. | 235/383 |
| 5,600,800 | 2/1997 | Kikinis et al. | 710/101 |
| 5,664,110 | 9/1997 | Green et al. | 705/26 |
| 5,689,654 | 11/1997 | Kikinis et al. | 710/101 |
| 5,708,840 | 1/1998 | Kikinis et al. | 708/105 |
| 5,892,971 | 4/1999 | Danielson et al. | 710/7 |
| 5,914,481 | 6/1999 | Danielson et al. | 235/472.01 |
| 5,923,735 | 7/1999 | Swartz et al. | 379/93.12 |

OTHER PUBLICATIONS

"Merriam Webster's Collegiate Dictionary," Tenth Edition, 1997.

Pankey, Deborah, "The supermarkeys of tomorrow Technology may make trips to the grocery store more pleasant," Chicago Daily Herald, p. 4, MNIS doc. #292107, May 27, 1998 (MNIS).

"Systems Integration Report: Manufacturers' Services Ltd. Garners Scanner Dispenser Contract," Manufacturing Automation, v5, n5, pN/A, Feb. 01, 1996.

Asthana, Abhaya; et al.; "Indoor Wireless System For personalized Shopping Assistance," Mobile Computing Systems and Applications—Workshop Proceedings 1995, IEEE, pp. 69–74, 1995.

"Money Manager Interview—Michael J. Walker, Oak Tree Prtfolio Management," Wall Street Transcript Digest, v13, n7, pN/A, May 16, 1994.

"3COM to demonstrate next–generation networked solutions at Markettechnics '98," M2 Presswire, pN/A, Feb. 20, 1998.

*Primary Examiner*—Eric W. Stamber
*Assistant Examiner*—Forest O Thompson

[57] ABSTRACT

The present invention relates to a personal shopping system for combined use in both the home of a user and a shopping establishment. The system includes a host computer which is coupled to a host modem and, optionally, to at least one wireless multi-access point. At least one shopping establishment kiosk cradle is employed to interface with a portable terminal which is also part of the system. The portable terminal can be used in both the shopping establishment and the home of the user. It is configured to read bar codes associated with items related to shopping, and includes a memory, a bar code reader, a wireless transceiver, and a data interface. The data interface of the terminal communicates with a data interface of the shopping establishment kiosk cradle. A home cradle for the portable terminal is also provided and is adapted to remain in the home of the user. It includes a home portable terminal-receiving station and a home data interface to communicate with the data interface of the portable terminal. A home data transfer circuit is also included to permit data exchange between the home data interface and the modem coupled to the host computer. The portable terminal can be provided with unique identifying indicia so that the terminal can serve as a form of identification for a user of the system. Database management of shopping lists for multiple establishments, including customer preferences, can be performed.

35 Claims, 9 Drawing Sheets

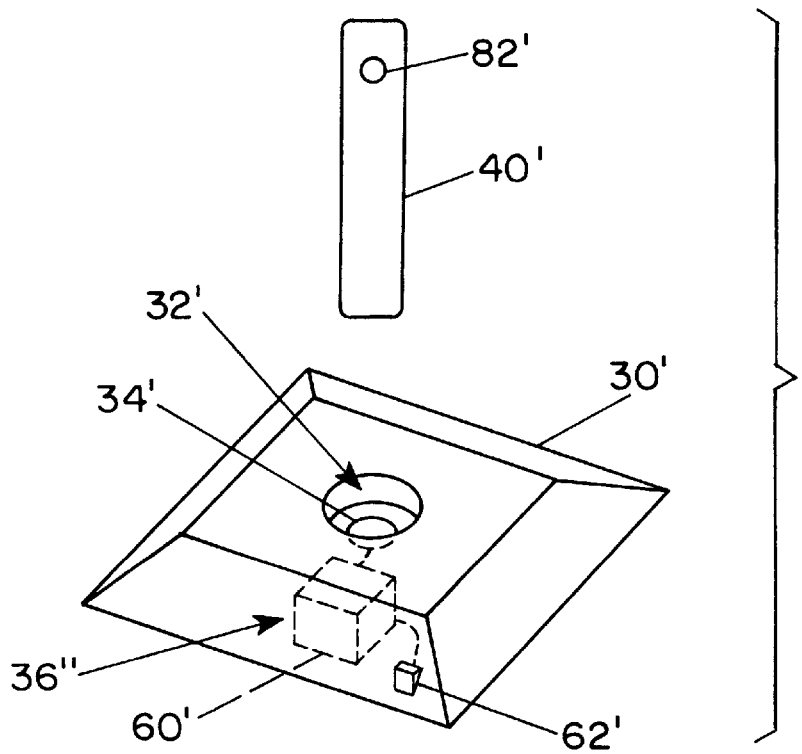
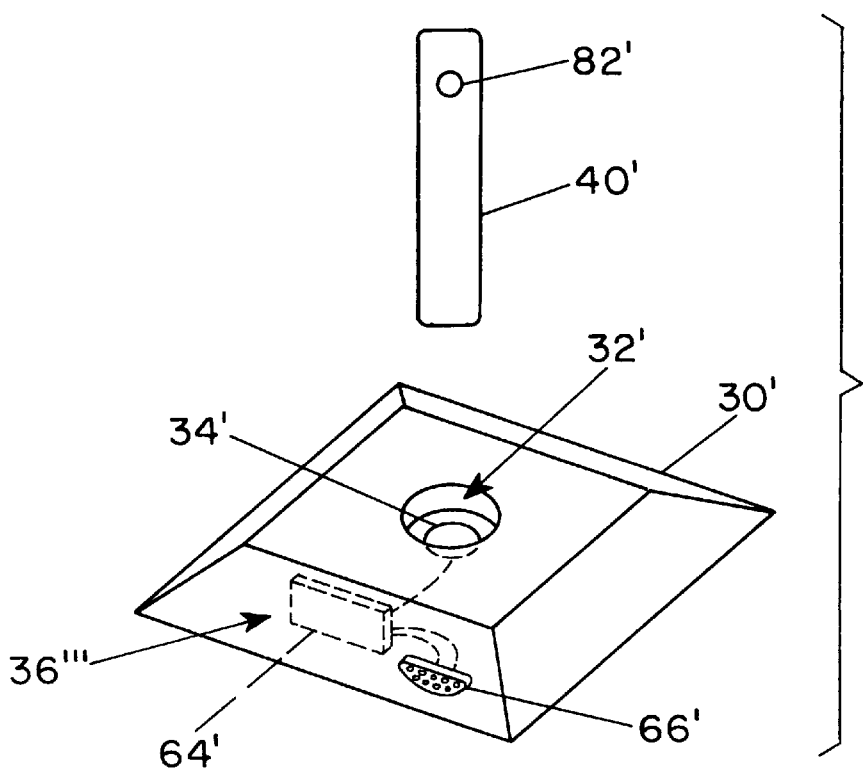

PERSONAL SHOPPING SYSTEM PORTABLE TERMINAL

FIELD OF USE

This invention relates generally to an improved system for ordering and supplying selected goods and services using an improved data communication system. More specifically, this invention relates to a portable terminal for use with a personal shopping system which can be used in both a home of a user and a shopping establishment.

BACKGROUND OF THE INVENTION

Hand-held computer terminals have been previously used in consumer portable shopping applications. One example of such a system is described in U.S. Pat. No. 5,468,942 to Oosterveen et al. The Oosterveen '942 Patent describes a system in which an authorized customer is issued a terminal having an integrated bar code scanner to record merchandise purchases. After items are scanned with the bar code scanner, the terminal maintains a record of merchandise selected for purchase by the customer within an internal memory. Prior to exiting the store, the information stored in the memory of the scanner is down loaded through a communication port attached to a terminal dispenser, and a printed ticket of the customer's purchases is printed on a printer. The customer then proceeds to a check out register where the customer tenders payment for the purchased merchandise. Occasional customers may be audited in order to ensure integrity of the self-service system.

U.S. Pat. No. 5,047,614 to Bianco discloses a method and apparatus for computer-added shopping. A consumer is provided with a hand-held bar code reader and can scan various items at home. The user can order from home over a modem, or can dock the bar code reader in a kiosk at a store, and can then receive a printed shopping list with directions. Yet further, a list of items can be transmitted from the store kiosk to a warehouse for remote picking.

U.S. Pat. No. 5,664,110 to Green et al. discloses a remote ordering system. A user is provided with a display/processor unit which has an interactive video display for building a shopping list. Information on various products is stored in local memory in the display/processor unit. Communication between the display/processor unit and a central data format/transfer computer takes place when an order is to be placed, or if the locally-available product information needs to be updated or is missing. Communication can be by telephone, fiber optics and the like.

Co-assigned U.S. patent application Ser. No. 08/866,690 filed May 30, 1997 discloses a portable shopping and order fulfillment system with enhanced ordering and product data profiles, order collection and order fulfillment. The disclosure of U.S. patent application Ser. No. 08/866,690 is hereby expressly incorporated herein by reference, as are the disclosures of its parent U.S. patent application Ser. No. 08/780,023 filed Dec. 20, 1996 and its grandparent U.S. patent application Ser. No. 08/706,579 filed Sep. 5, 1996.

The prior art self-checkout systems can enhance the consumer's shopping experience. However, they exhibit certain deficiencies. For example, they may not provide adequate security, or may require cumbersome separate cards for security purposes. Further, prior art systems may not be able to deal effectively with multiple shopping establishments or varying user needs. There currently exists a need for a personal shopping system portable terminal with a convenient security system, and which is capable of enhanced shopping database management.

SUMMARY OF THE INVENTION

It is the object of the present invention to provide an improved portable terminal which may be used in a personal shopping system.

It is a further object of the present invention to provide such an improved portable terminal with an enhanced security system.

It is yet a further object of the present invention to provide an improved portable terminal which can be used by a given consumer in both a home and store location, and can perform enhanced shopping database management.

The present invention provides a personal shopping system for combined use in both the home of the user and at least one shopping establishment. The system includes a host computer coupled to a host modem, and at least one shopping establishment kiosk cradle. The system farther includes a portable terminal according to the present invention which comprises a two-way data interface configured to read bar codes associated with items related to shopping, and a memory coupled to the two-way data interface for storing data associated with the bar codes. The two-way data interface is configured for data exchange with other data interfaces to be discussed below.

The shopping establishment kiosk cradle includes a kiosk portable terminal-receiving station and a kiosk data interface associated with the kiosk portable terminal-receiving station. The shopping establishment kiosk cradle accepts the data associated with the bar codes from the portable terminal through the kiosk data interface and the terminal two-way data interface when the portable terminal is received in the kiosk portable terminal-receiving station, and then downloads the data associated with the bar codes to the host computer.

A home cradle associated with the home of the user is also provided. The home cradle includes a home portable terminal-receiving station and a home data interface which is associated with the home portable terminal-receiving station. The home cradle also includes a home data transfer circuit which is coupled to the home data interface for data exchange therewith. The home data transfer circuit is configured for data exchange with the host modem. The terminal two-way data interface of the portable terminal is configured for data exchange with the home data interface when the portable terminal is received in the home portable terminal-receiving station. The home data transfer circuit supplies the host computer with the data associated with the bar codes when the portable terminal is received in the home portable terminal-receiving station. The host computer receives the data associated with the bar codes, whether from the kiosk cradle or the home cradle, and stores the data in a shopping list data base.

The portable terminal can contain intrinsic identifying indicia to identify the user to the host computer. The memory of the portable terminal can be configured to store multiple lists of data associated with the bar codes, as multiple shopping lists corresponding to multiple shopping establishments.

The present invention comprises the portable terminal, the portable terminal in combination with the home cradle, and the portable terminal and home cradle in combination with the remaining components of the system, including the host computer, the host modem, and at least one shopping establishment kiosk cradle.

The present invention also provides a method of placing an order for items including at least one of goods and services. The method includes the steps of reading bar codes associated with the items via a two-way terminal data interface of a portable terminal; storing data associated with the bar codes in a memory of the portable terminal; and then transferring the data associated with the bar codes to a host computer for storage in a shopping list database. The transferring step includes the sub-steps of transferring the data associated with the bar codes from the memory of the portable terminal to the two-way terminal data interface of the portable terminal; transferring the data associated with the bar codes from the two-way terminal data interface to a data interface of either a kiosk portable terminal-receiving station of a shopping establishment kiosk cradle or a home portable terminal-receiving station of a home cradle; and then transferring the data to the host computer. The method further includes transmitting identifying indicia to the host computer to identify the user to the host computer; the indicia can be the aforementioned intrinsic identifying indicia contained in the portable terminal. A telephone "caller ID" function can be employed for additional security.

BRIEF DESCRIPTION OF THE DRAWINGS

The present invention will be understood and appreciated more fully from the following detailed description, taken in conjunction with the drawings, in which:

FIG. 8A is a third embodiment of home cradle for use with the second embodiment of portable terminal of the present invention;

FIG. 8B is a fourth embodiment of home cradle for use with the second embodiment of portable terminal of the present invention;

DETAILED DESCRIPTION OF THE PREFERRED EMBODIMENTS

Figure 1:
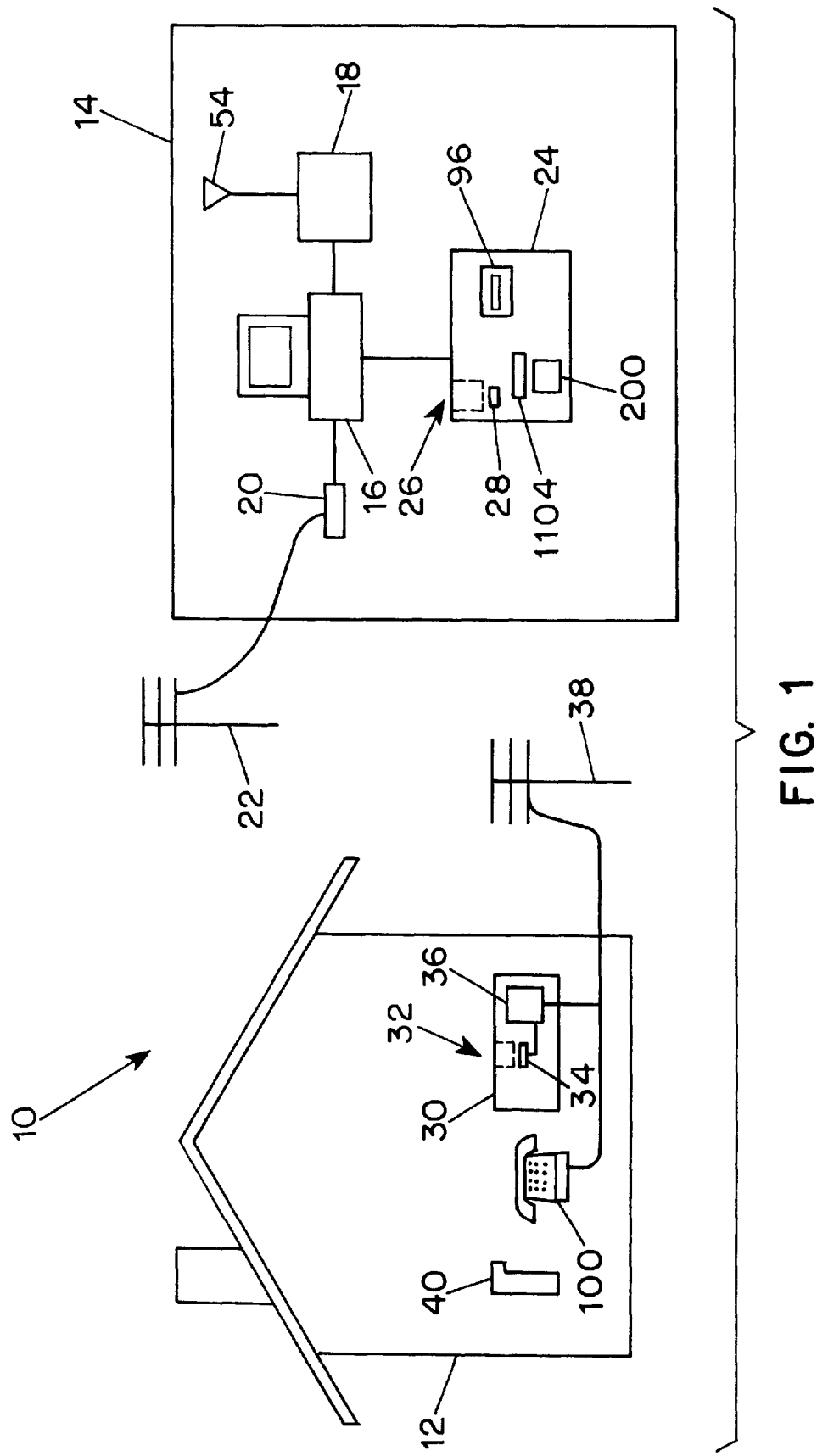
FIG. 1 is a semi-schematic view of a personal shopping system employing the portable terminal of the present invention.

With reference to FIG. 1, a personal shopping system 10 is suitable for combined used in both a home 12 of a user and at least one shopping establishment 14. The system includes a host computer 16. Host computer 16 can be located in shopping establishment 14, or can be otherwise associated therewith; e.g., it can be remotely located therefrom but in communication with other components of the system within shopping establishment 14. Internet access to host 16 can be employed. System 10 also optionally includes at least one wireless multi-access point 18 which is associated with the shopping establishment 14 and which is coupled to the host computer 16. Wireless multi-access point 18, if used, would normally be present in or near shopping establishment 14 in order to pick up signals from a portable terminal to be discussed below, when the portable terminal is present within the shopping establishment 14.

The system further includes a host modem 20 which can be situated similarly to the host computer and which is coupled to the host computer 16. Host modem 20 can in turn be coupled to a public or private telephone line 22 which may be hard-wired, cellular, satellite and the like.

The system further includes at least one shopping establishment kiosk cradle 24 coupled to the host computer 16. The kiosk cradle 24 in turn includes a kiosk portable terminal-receiving station 26 and a kiosk data interface 28 which is associated with the kiosk portable terminal-receiving station 26. By "associated" it is meant that the kiosk optical interface 28 is located so as to communicate with a two-way data interface of the portable terminal, to be discussed below, when the portable terminal is placed in the portable terminal-receiving station 26.

The system yet further includes a home cradle 30 which is associated with the home 12 of the user. In this context, "associated" would normally imply that the home cradle 30 is located within the home or at some nearby location where it is convenient for the user to use the home cradle without having to separately travel to a shopping establishment 14. Home cradle 30 includes a home portable terminal-receiving station 32 and a home data interface 34 which is associated with the home portable terminal-receiving station 32. Again, by "associated" it is meant that the data interface 34 is so located so as to interface with a corresponding two-way data interface of a portable terminal, to be discussed below, when the portable terminal is placed in the portable terminal-receiving station 32 of the home cradle 30.

Home cradle 30 still further includes a home data transfer data circuit 36. Transfer circuit 36 is coupled to the home data interface 34 so as to engage in data exchange with the optical interface, and is also configured for data exchange with the host modem 20. Such data transfer can occur, for example, through telephone line 38 which can be any of the types discussed above for telephone line 22.

Figure 3A:
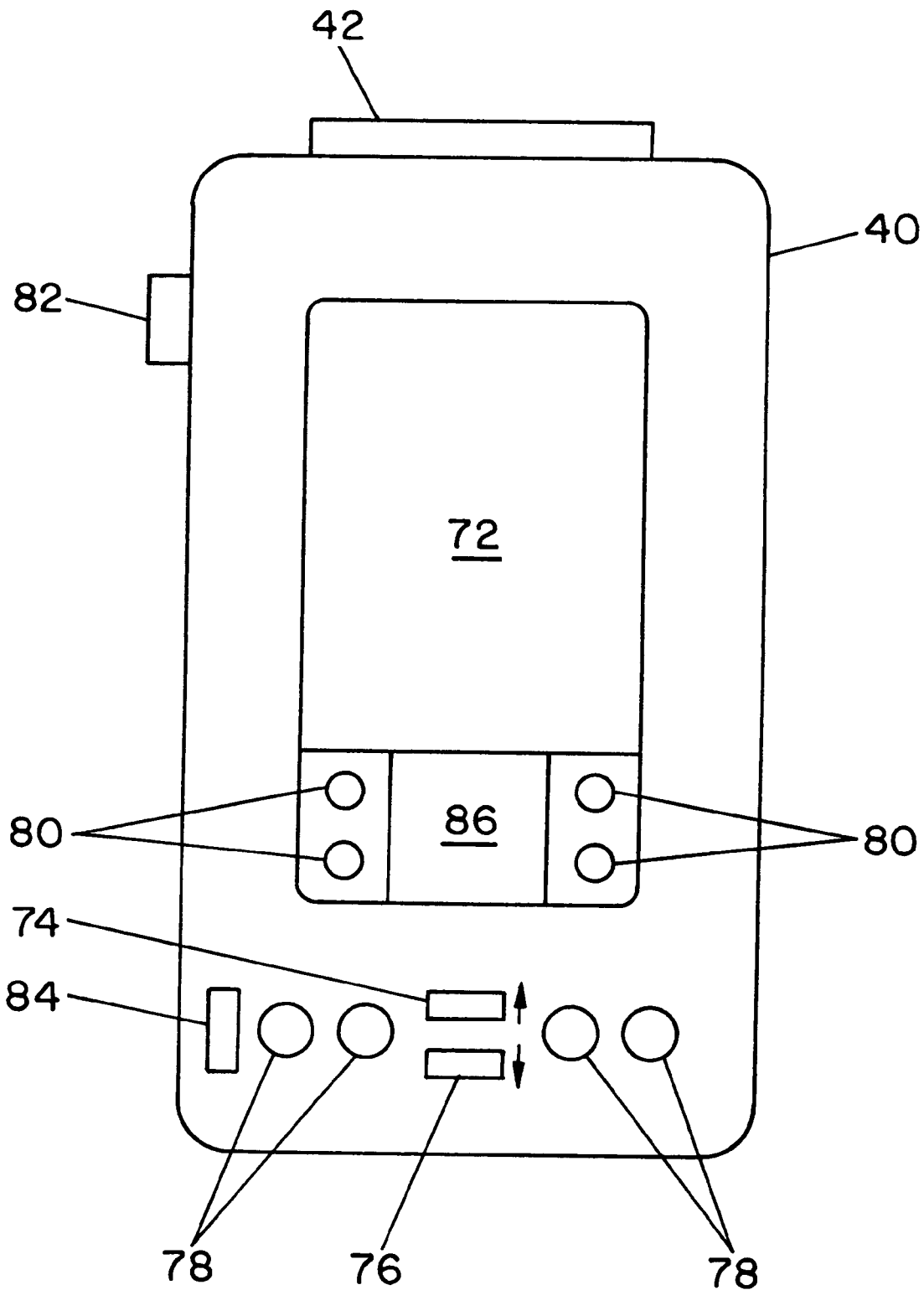
FIG. 3A is a front elevational view of a first embodiment of portable terminal of the present invention.
Figure 3B:
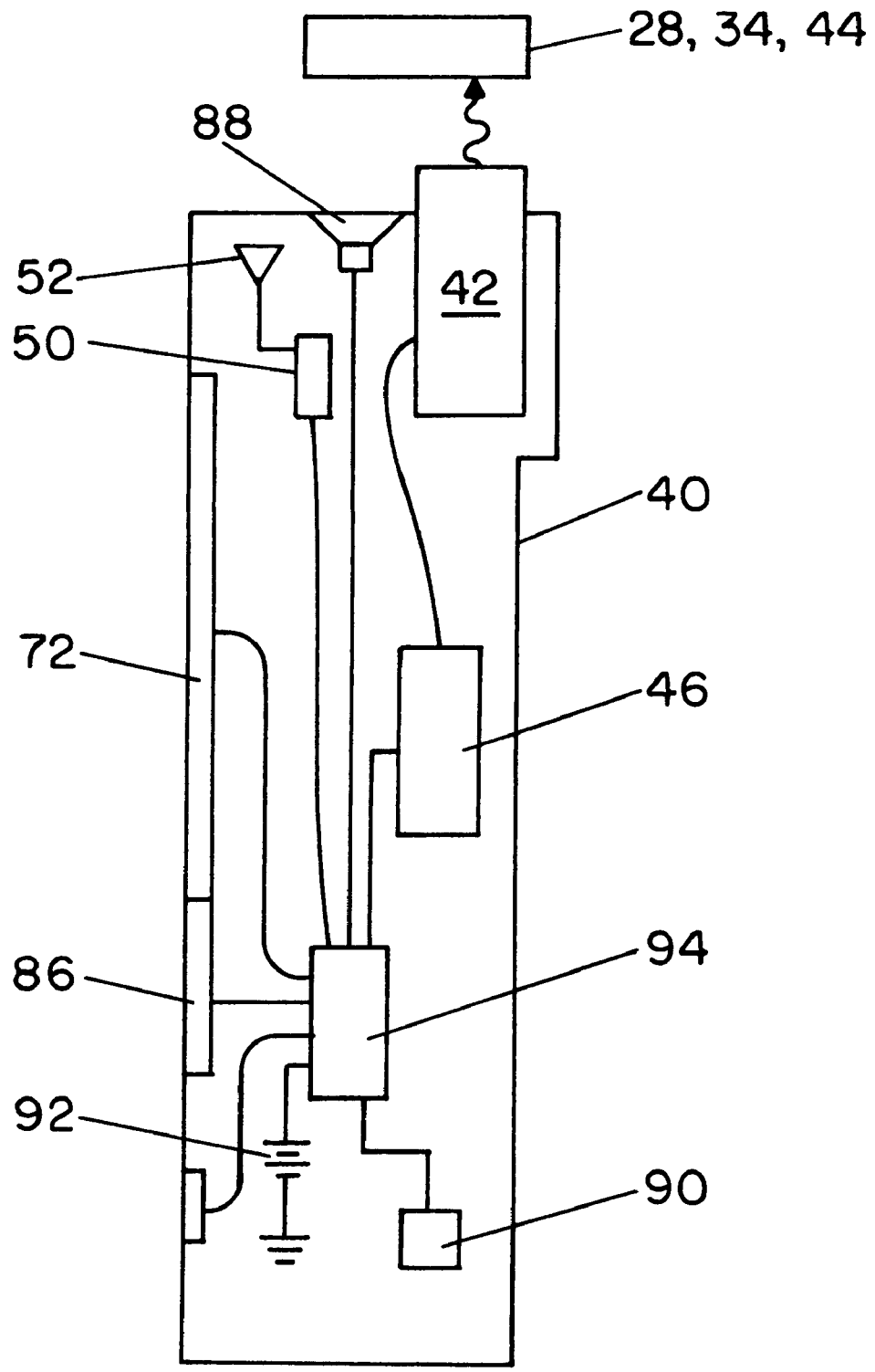
FIG. 3B is a side semi-schematic cross-sectional view of the portable terminal of FIG. 3A.

The system also includes a portable terminal 40. It will, of course, be appreciated that normally there will be many such terminals for the different users of the system. However, only a single terminal 40 is shown in the drawings in order to clearly illustrate the principles of the present invention. Referring now to FIGS. 3A and 3B, a first embodiment of portable terminal 40 includes a two-way data interface 42 which is configured to read bar codes associated with items 44 related to shopping. The items 44 can be, for example, empty packages of items which it is desired to re-stock; items from a catalog representing goods or services; and the like. Portable terminal 40 also includes a memory 46 coupled to the two-way data interface 42 for storing data associated with the bar codes from the items 44. Memory 46 could include RAM and also identification ROM circuitry discussed below. Terminal two-way data interface 42 is configured for data exchange with the kiosk data interface 28 when the portable terminal 40 is received in the kiosk portable terminal-receiving station 26. Terminal data interface 48 is also configured for data exchange with the home data interface 34 when the portable terminal 40 is received in the home portable terminal-receiving station 32. Items 28, 34 & 44 are all depicted schematically by a single rectangle in FIG. 3B; it will be appreciated that they are in fact separate items which are merely illustrated in this fashion for convenience.

Portable terminal 40 can further optionally include a wireless transceiver 50 which is coupled to memory 46 and which is configured for wireless communication with the optional at least one wireless multi-access point 18 when a user of the system takes the portable terminal 40 into the shopping establishment 14. Optional transceiver 50 may be provided with a suitable antenna 52 which is compatible with an antenna 54 of wireless multi-access point 18 (as shown in FIG. 1). Optionally, an initialization procedure can be carried out on terminal 40 when entering a shopping establishment 14, by swiping a special bar code or otherwise, to set an appropriate frequency for wireless communication and to enter an appropriate code for security and identification purposes.

In operation, home data transfer circuit 36 supplies host computer 16 with the data associated with the bar codes of the shopping-related items 44 when the portable terminal 40 is received in the home portable terminal-receiving station 32. Shopping establishment kiosk cradle 24 accepts the data associated with the bar codes of the shopping-related items 44 from the portable terminal 40 through the kiosk data interface 28 and the terminal two-way data interface 42 when the portable terminal 40 is received in the kiosk portable terminal-receiving station 26, and then downloads the data associated with the bar codes of shopping-related items 44 to the host computer 16. Host computer 16 receives the data associated with the bar codes of the shopping-related items 44 and stores the data in a shopping list database.

Figure 4:
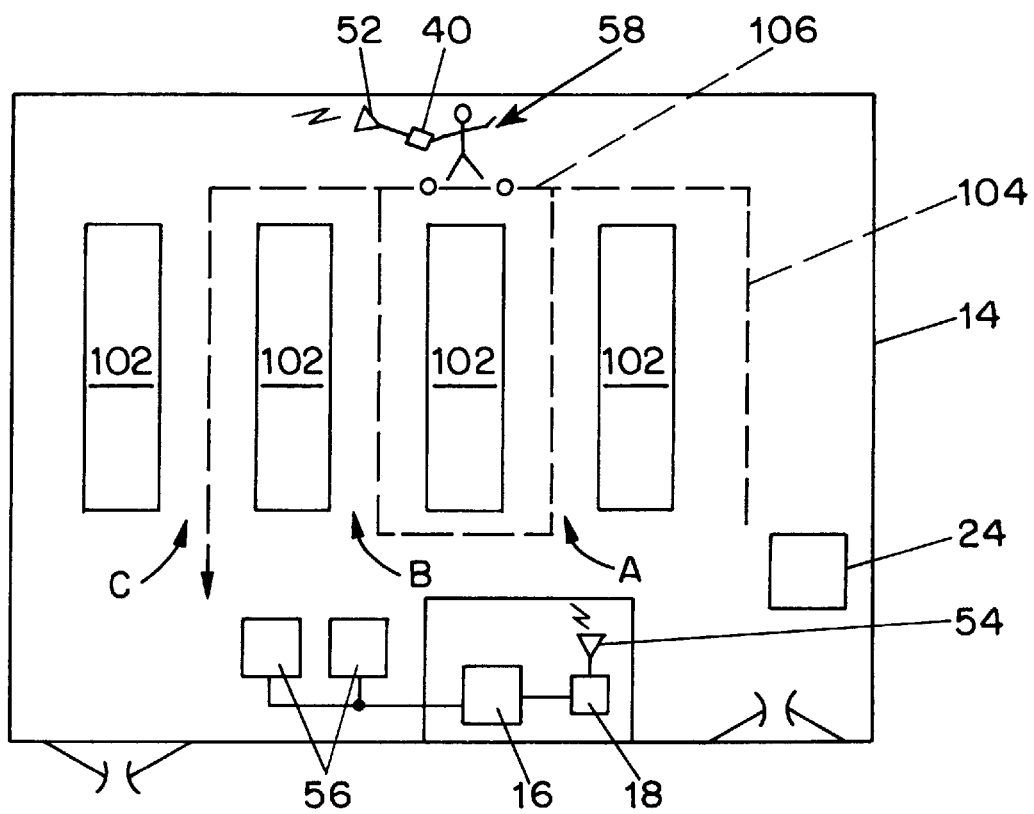
FIG. 4 is a semi-schematic plan view showing use of the portable terminal in a shopping establishment.

With reference to FIG. 4, the system 10 can also include at least one point-of-sale checkout terminal 56 associated with the shopping establishment 14 and coupled to the host computer 16. Point-of-sale checkout terminal 56 can be employed by a user 58 to pay for purchases made with system 10 (optionally, with assistance from a sales clerk).

The portable terminal 40 can further include intrinsic identifying indicia (not amenable to further illustration) to identify the bearer to the host computer 16 as an authorized user 58. Such indicia can include a unique identification code which can be "burned in" to circuitry (e.g., ROM, PROM, EPROM) of the portable terminal 40 or which may be set, for example, by dip switches or in any other convenient manner. Thus, once the user 58 receives authorized possession of the portable terminal 40, he or she need not have a separate ID card. Terminal 40 can thus function as an "identifying token" or "electronic key." A personal identification number (PIN) can be used instead or as a supplement, for added security (to guard against theft of terminal 40). Yet further, terminal 40 can be used in conjunction with a credit or debit card of the user and can have identical identifying indicia (and an identical PIN); interface with the magnetic strip reader could be provided for entering credit card information into terminal 40 or directly into host 16.

Figure 5A:
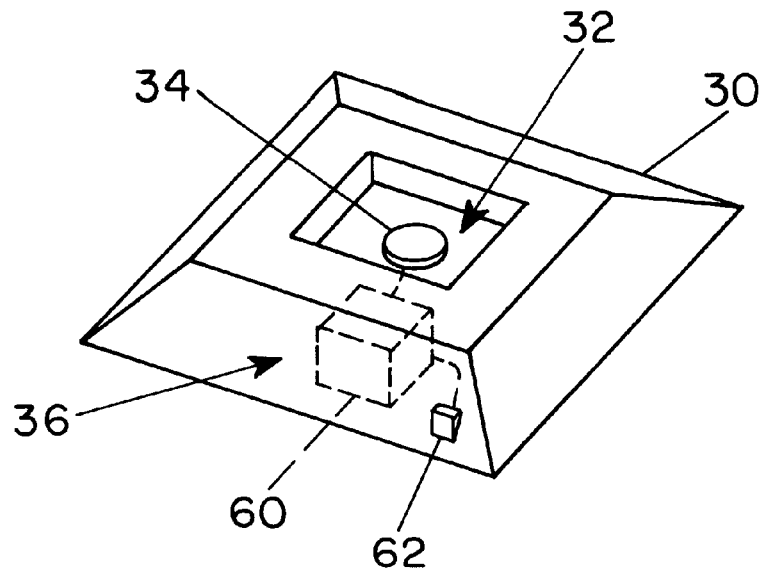
FIG. 5A is a first embodiment of home cradle for use with the first embodiment of portable terminal of the present invention.

With reference now to FIGS. 1 and 5A, home data transfer circuit 36 can simply be a home modem 60 which communicates with host modem 20. A suitable telephone jack 62 can also be provided. The telephone can be connected directly to the phone system as shown in FIG. 1 or, alternatively, it can be connected to the phone system via the cradle 30 so that a user will not inadvertently pick up the phone during communication.

Figure 2:
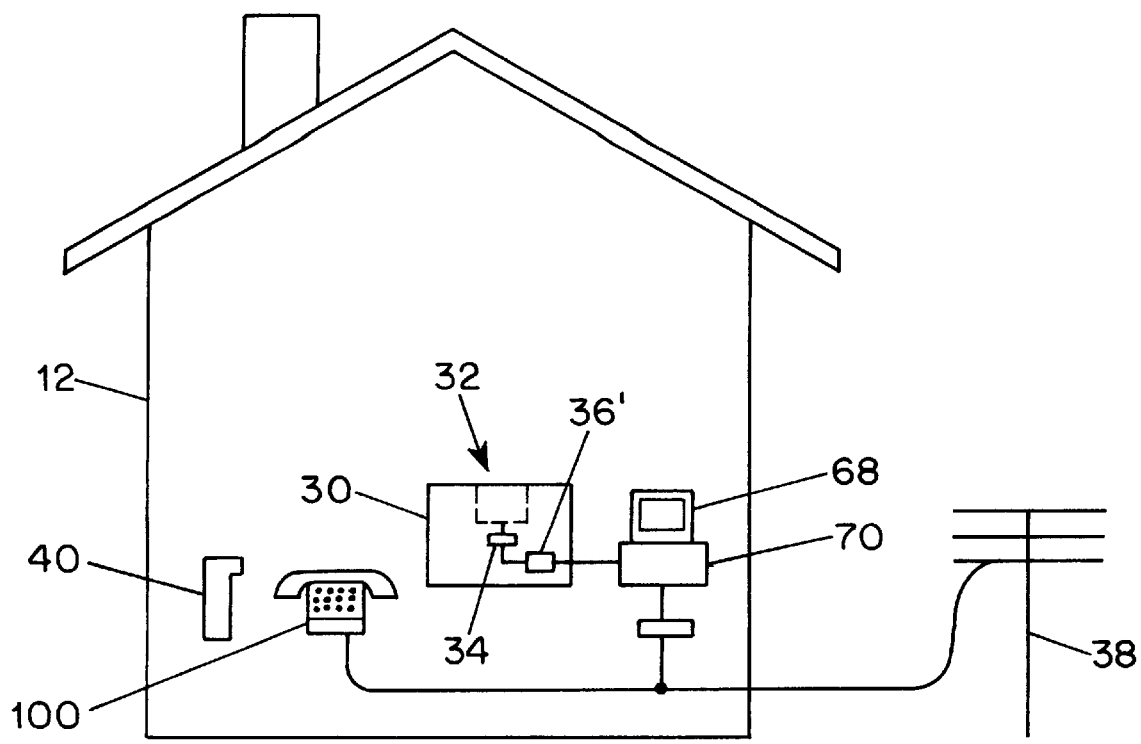
FIG. 2 is an alternative embodiment of a home portion of the system of FIG. 1.
Figure 5B:
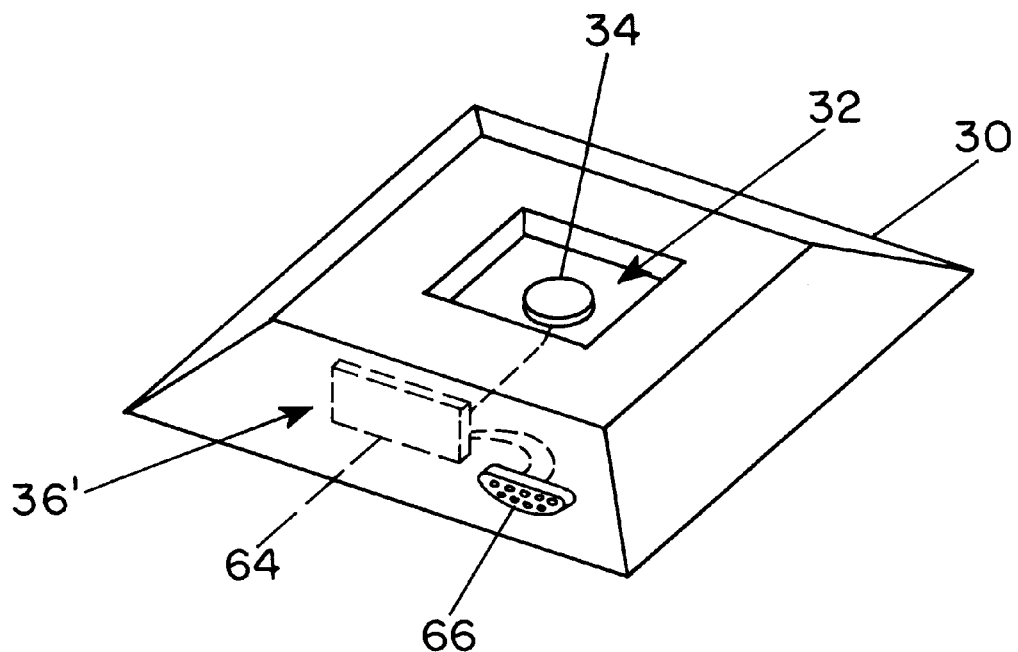
FIG. 5B is a second embodiment of home cradle for use with the first embodiment of portable terminal of the present invention.

Reference should now be had to FIGS. 2 and 5B which illustrate a system with an alternative data transfer circuit and wherein like parts have received the same number. Alternative data transfer circuit 36' includes an interface card 64 for coupling the home cradle 30 to a separate home personal computer 68 and home modem 70, which in turn communicate with host modem 20. Card 64 can be coupled to home computer 68 through a suitable computer cable connector 66, for example. It should be appreciated that kiosk data interface 28 and home data interface 34 can be any type of suitable interface, for example, optical, electrical plug, radiophone, inductive transfer (such as used in heart rate monitors), and the like, including combinations thereof. Optical interfaces are illustrated for convenience. Similarly, any type of suitable interface can be employed for two-way data interface 42 of terminal 40: optical, electrical plugs, radiophone, inductive transfer, and the like. A two-way optical interface is illustrated in FIGS. 3A and 3B for convenience. In such a system, a stationary light source may be employed and item 44 may be "swiped."

Figure 9A:
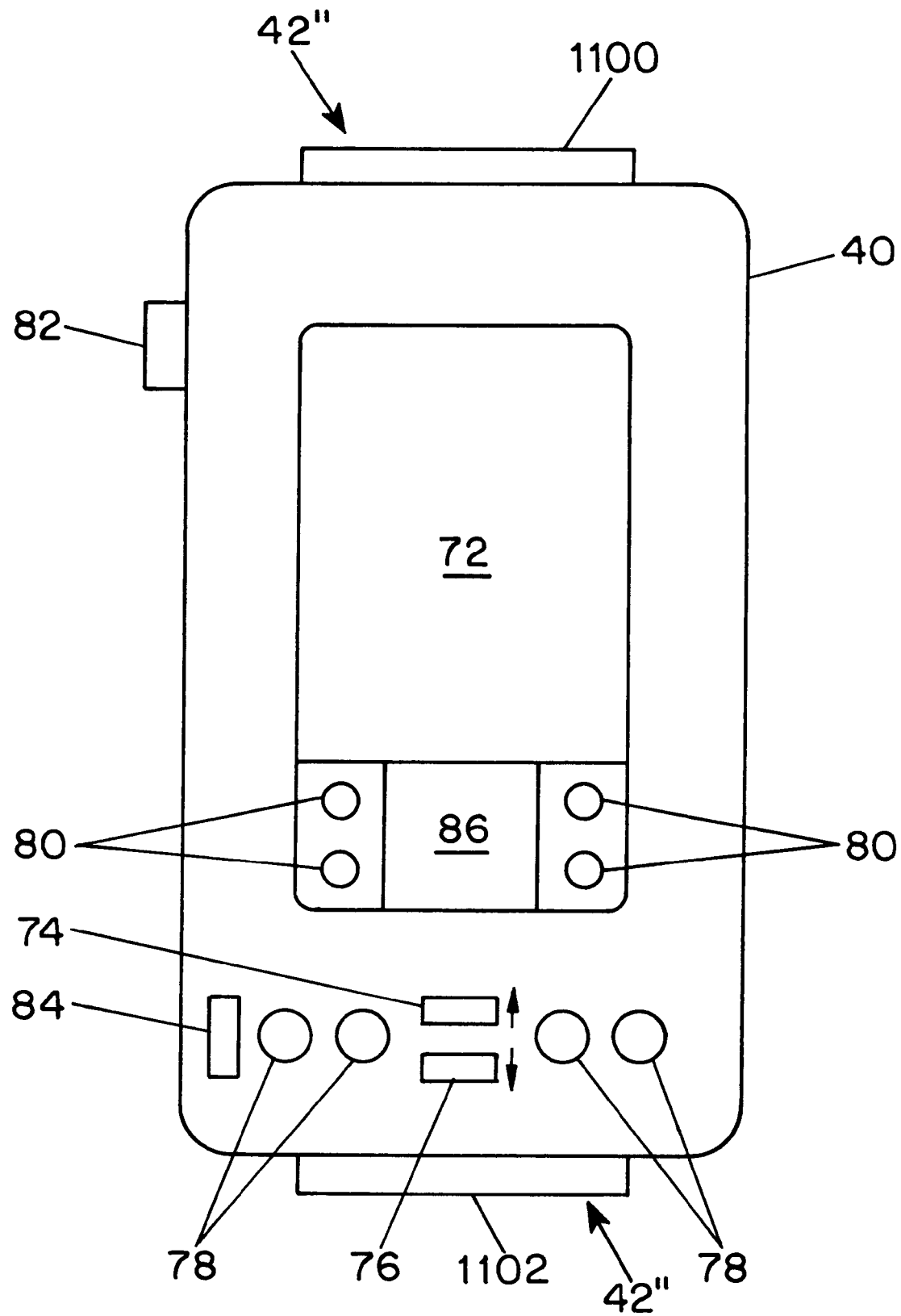
FIG. 9A is similar to FIG. 3A but depicts a third embodiment of portable terminal of the present invention.
Figure 9B:
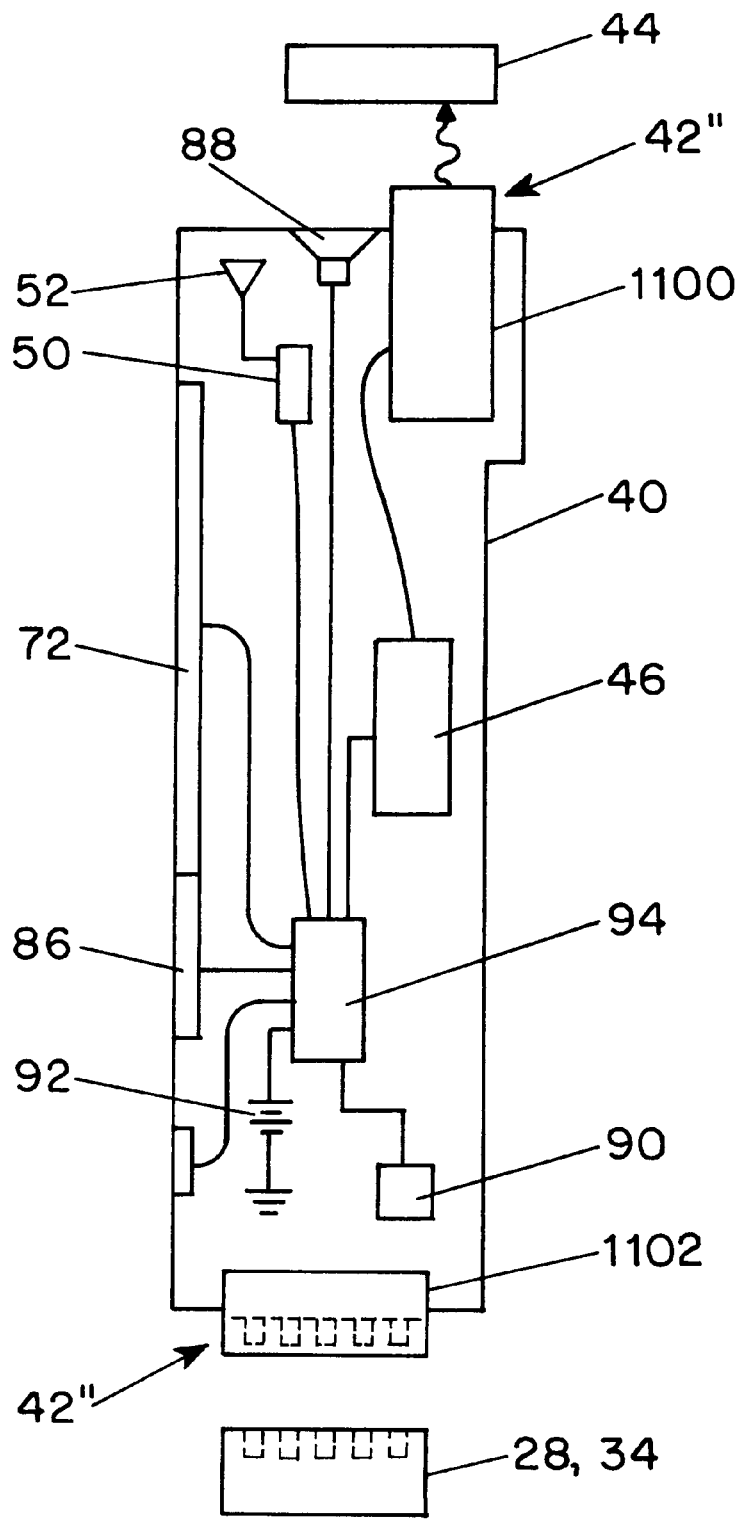
FIG. 9B is similar to FIG. 3B but also depicts the third embodiment of portable terminal of the present invention.

Reference should now be had to FIGS. 9A and 9B, which are similar to FIGS. 3A and 3B except for a different two-way data interface 42" which is formed by a bar code scanner such as conventional moving laser bar code scanner 1100, and a separate electrical plug-type connector 1102 (or other interface discussed above) for communication with the other data interfaces of the system, which in this case would also be electrical plug (or other corresponding) types. Thus, a nominally "one-way" bar code scanner, such as item 1100, and the plug-type connector 1102 (or other interface) together enable two-way communication and form two-way data interface 42".

With reference now again to FIGS. 3A and 3B, portable terminal 40 can optionally include a display 72 for displaying information to the user and a plurality of control keys for permitting the user to interact with the display 72. The control keys can include, for example, up and down scroll keys 74 and 76 respectively. Hard function keys 78 can be included, for example, to call up a calendar, telephone list, shopping list, and notes associated with the shopping list. One or more touch keys 80 can be provided for purposes of custom applications to allow a soft function approach to interactive program inputs. A separate button 82 can be used to trigger bar code reading while an additional button 84 can be provided to initiate data transfer on docking in either of cradles 24,30. A region 86 can be provided for purposes of communication via optical character recognition, for example, using the so-called "Graffiti Alphabet" of the Palm Computing Palm Pilot Device.

Portable terminal 40 can also include a speaker 88 for supplying audible messages to the user. Speaker 88 can also beep when a bar code has been successfully read, and can beep a different tone or pattern of tones when scanning has not been successful. Terminal 40 can further include a position-sensing module 90 for sensing the position of the user within the shopping establishment 14 and for communicating with the user via the display 72 (or otherwise) when the user has deviated from an optimal shopping path in the shopping establishment 14. Module 90 can also be used to alert the customer to specials in their area and add them to their list of selected items. When speaker 88 is present, the communication with the user can be audibly through speaker 88. Module 90 can interface, for example, with a GPS or similar system. Alternatively, various receivers can be located throughout shopping establishment 14 to sense the presence of user carrying terminal 40, as is known in the art of patient monitoring for hospitals. Further details will be provided below regarding the user's path through the shopping establishment, in a discussion of the method of the present invention.

Terminal 40 can include a suitable power source 92, for example, suitable dry cell batteries. Further, a control module 94 can be provided to drive the display 72 and to control the operation of the various other components of terminal 40.

The above-described portable terminal 40 can be formed by adding a suitable two-way data interface 42 (and optional buttons 82, 84), as well as other herein-described components, to the well known Palm-Pilot device manufactured by Palm Computing.

Figure 6:
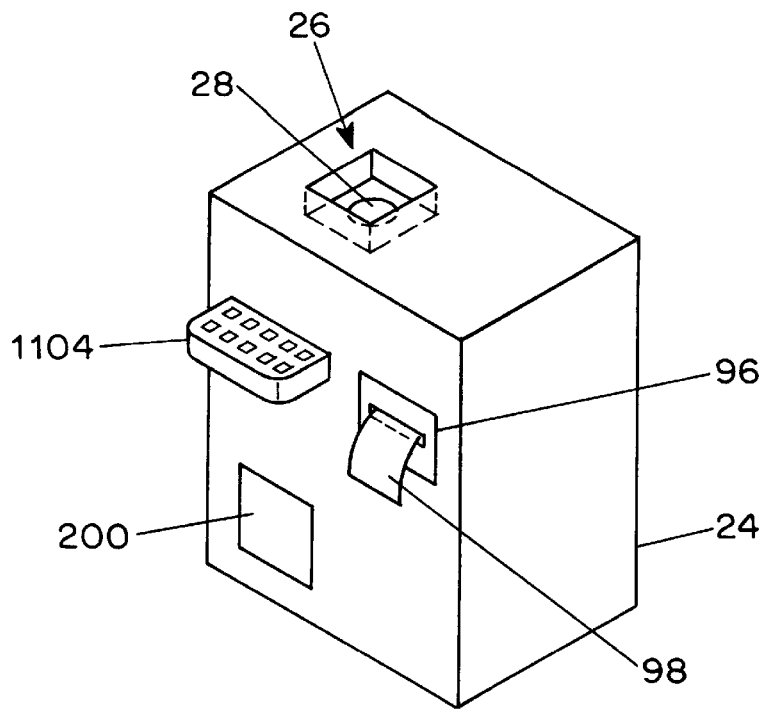
FIG. 6 is a perspective view of a shopping establishment kiosk cradle of the present invention.

Referring now to FIG. 6, kiosk cradle 24 includes kiosk portable terminal-receiving station 26 and kiosk optical interface 28. A printer 96 may be provided and can be used to print out a hard copy shopping list 98 in response to information in the shopping list database. Printer 96 can also provide recipes, nutritional information, advertising, news, product warnings and/or coupons. A display 200 can also be provided. A keyboard 1104 can be provided for entering a PIN. In addition a smart card reader may be used to initiate a self tendered transaction.

It will be appreciated that the present invention can comprise the assembly of all the aforementioned components. However, the invention also contemplates a home station comprising the above-mentioned home cradle 30 and portable terminal 40 only. Home cradle 30 would normally remain within the home of the user, while portable terminal 40 is portable between the home and shopping establishment 14. Yet further, the present invention also contemplates the personal shopping system portable terminal 40 by itself.

The present system can be employed with a telephone 100 of a user, having an ordinary touch-tone key pad, and associated with the user's home 12, for purposes which will be discussed fully below.

Figure 7:
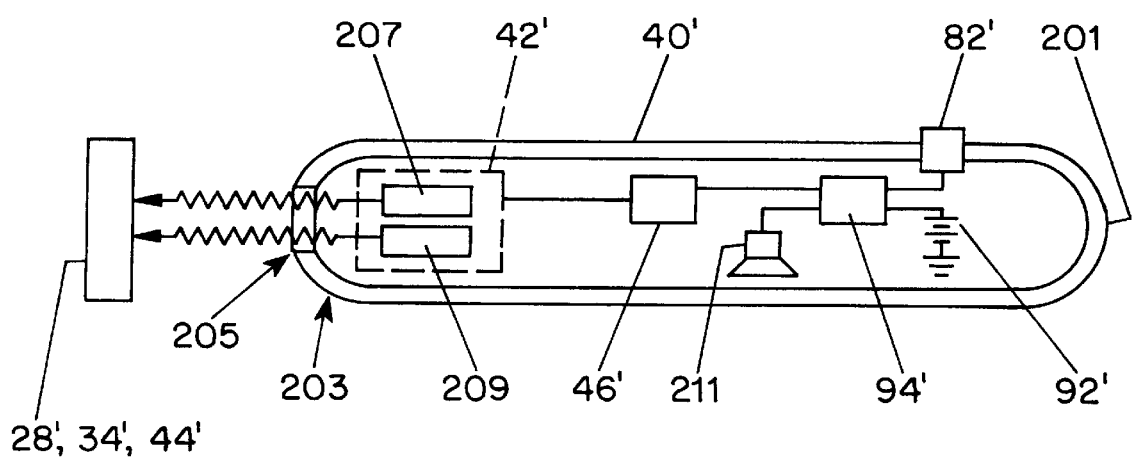
FIG. 7 is a side semi-schematic cross-sectional view of a second embodiment of portable terminal of the present invention.

With reference to FIGS. 7, 8A and 8B, an alternative embodiment of portable terminal 40 in accordance with the present invention will now be described. Items similar to those described above for the first embodiment 40 have received the same reference character but with a "prime" following it; item 36" corresponds to item 36 and item 36" corresponds to item 36. Alternative portable terminal 40' is generally pen-shaped, and has an elongate pen-shaped housing 201 having an end 203 with an optically transparent passage 205 therethrough. The memory 46' and the two-way terminal data interface 42' are arranged in the housing 201 with the two-way terminal data interface 42' positioned for communication (preferably optical) through the transparent passage 205. In any of the embodiments of the present invention, the two-way terminal data interface 42' can include a light emitting diode 207 and a photodetector 209, employed in a manner well-known in other optical communication systems. Other types of data interfaces as discussed above can also be used in terminal 40'.

Alternative embodiment 40 can also include a trigger 82 for triggering reading of bar codes located on shopping-related items 44'. This function can also instead be automatic, e.g., upon "swiping" an item 44'. A speaker 211, or other "beeping" device, can also be provided as above. Note that the kiosk data interface 28', home data interface 34', and shopping-related items with bar codes 44' are all represented by the same rectangle in FIG. 7, as they were above in the first embodiment. Alternative embodiment 40' can also include a power source 92' and control module 94 as described above. The alternative embodiment 40' can have diameter of about ⅜ inches and a length of about 5–6 inches to permit convenient carrying and storage by a user, for example, in a pocket or purse like an ordinary pen, and can thus be configured for easy gripping by a user of the system.

FIGS. 8A and 8B are entirely similar to FIGS. 5A and 5B above, except that the portable terminal-receiving station is shaped to receive the alternative embodiment of portable terminal 40. It should be noted that wherever portable terminal 40 is discussed in this application, the discussion also includes alternative embodiment of portable terminal 40'. Certain features of portable terminal 40, such as the display, may not be most conveniently incorporated into portable terminal 40 due to its more compact shape; this will be apparent when reading the appropriate passage in this application.

Either embodiment of terminal 40 or 40' can be combined with a cordless telephone as a convenience and also to use the wireless communication circuitry of the cordless phone for data interface purposes. Reference numerals 32', 60', 62', 64' and 66', as well as other primed numerals of FIGS. 8A and 8B, designate components disclosed with respect to corresponding reference numerals 32, 60, 62, 64 and 66, as well as other corresponding unprimed numerals of FIGS. 5A and 5B.

A method, according to the present invention, of placing an order for items including at least one of goods and services will now be described. The method includes the step of reading bar codes associated with the shopping-related items (i.e., goods and/or services) with a two-way data interface 42 of a portable terminal 40. The method further includes the step of storing data associated with the bar codes in a memory 46 of the portable terminal 40. The method yet further includes the step of transferring the data associated with the bar codes to a host computer 16 for storage in a shopping list database. The transferring step includes the sub-steps of transferring the data associated with the bar codes from the memory 46 of the portable terminal 40 to the two-way terminal data interface 42 of the portable terminal 40; and then transferring the data associated with the bar codes from the two-way terminal data interface 42 to an data interface of either the kiosk portable terminal-receiving station 26 or the home portable terminal-receiving station 32; and then to the host computer. As described above with respect to the apparatus, the kiosk portable terminal-receiving station is part of the shopping establishment kiosk cradle 24 which is coupled to the host computer 16.

The home portable terminal-receiving station is part of the home cradle 30 which is associated with the home 12 of the user and is also coupled to the host computer 16. When the portable terminal 40' is used in the home, the data associated with the bar codes will be transferred to the data interface 34 of the home portable terminal-receiving station 32. In this case, the inventive method can include the additional steps of reading a bar code on a shopping-related item 44 which is a special bar code associated with a shopping establishment 14, using the two-way data interface 42 of the portable terminal 40. In response to the reading of the special bar code, home cradle 30 can automatically contact the shopping establishment 14 when the portable terminal 40 is placed in the home portable terminal-receiving station 32 of the home cradle 30. The contacting is done on the basis of information encoded in the bar code associated with the shopping establishment 14.

The method of the present invention can also include the step of transmitting identifying indicia, for example, intrinsic identifying indicia which may be contained in the terminal 40, from the portable terminal 40 to the host computer 16 to identify the user to the host computer, as discussed above with respect to the apparatus. The method can also include the additional step of displaying relevant portions of the shopping list database, discussed above, on the display 72 of the portable terminal 40.

When portable terminal 40 is used in the home 12, and the data associated with the bar codes is transferred to the data interface 34 of the home portable terminal-receiving station 32, host computer 16 can send at least one verification query to home cradle 30 in order to verify at least one of correctness and validity of an order which is based on the shopping list database. The step of sending the verification query can include sending the verification query as a human language audible query to the telephone 100 which is coupled to the home cradle 30. Additionally or alternatively, the step of sending the verification query can include sending the verification query as a signal which triggers visual display of the verification information on display 72 of portable terminal 40. The verification query process can also include caller identification to prevent theft of goods and/or services. If the "caller ID" does not match the telephone number associated with the authorized user's home phone, e.g., the transaction could be denied. The home phone would normally in turn be associated with the authorized user's home portable terminal-receiving station. Further, the user can be prompted to enter a personal identification number (PIN) to supplement, or in lieu of, identifying indicia in the terminal 40 itself. The PIN can be entered on the keypad of telephone 100, separate home PC 68, or a keypad (not shown) on home cradle 30. A display could also be provided on home cradle 30 for use with terminals 40', e.g., which might not have a display.

Still referring to use of terminal 40 in the home 12, when using the alternative embodiment of data transfer circuit 36 discussed above, the data associated with the bar codes is transferred from the home portable terminal-receiving station 32, through a suitable interface card 64, to a separate home personal computer 68 of the user, and then through a home modem 70 to the host computer. In this case, the method can include the additional steps of sending at least one verification query from the host computer 16 to the separate home computer 68, and then responding to the at least one verification query with at least one response emanating from the separate home computer 68.

It will be appreciated that the audible and computer related approaches are preferred when using the portable terminal 40' which may be too small to have a display.

Method steps associated with use of portable terminal 40 in shopping establishment 14 will now be described. It is to be appreciated that when portable terminal 40 is used in shopping establishment 14, data associated with the bar codes scanned in the home 12 of the user is transferred to the data interface 28 of the kiosk portable terminal-receiving station 26. With reference to FIG. 6, the method can include the additional step of printing a hard copy shopping list 98 from the kiosk cradle 24, for example, with printer 96, in response to the data associated with the bar codes which were read in the home 12. It will be appreciated that a user of the system can simply check off data items listed on the hard copy shopping list 98 with a conventional ink pen as the items are picked up off the shelves 102 (see FIG. 4) of the shopping establishment 14 and scanned with the portable terminal 40. Thus, it will be appreciated that the method according to the present invention can include the method step of scanning new items required to be purchased, in the shopping establishment 14, with the portable terminal 40. The scanning can be in response to the hard copy list, or in response to one or more embodiments of electronic list. When an electronic list is employed, the method can include the additional step of updating the electronic list in the memory 46 of the portable terminal 40 to indicate that a given one of the required new items has been obtained. By "new items" is meant goods or services in the shopping establishment 14 which are desired by the user of the system. "New" is used to distinguish these items from the (presumably) old items which were scanned at home and which require renewal or replacement. A PIN can be entered on keyboard 1104 of kiosk cradle 24.

When using a portable terminal such as pen-type terminal 40', which may not have a display, a user can simply periodically re-dock terminal 40' in kiosk 24 to check the updated electronic list, for example, to print a revised list with scanned items "crossed off," or to view a revised list on optional display 200 of kiosk 24.

Either the hard copy or electronic shopping list can be produced as an optimized shopping list in response to the shopping list database and information contained in the host computer 16 about location of the items within the shopping establishment 14. The optimized shopping list can be ordered to direct the user through the shopping establishment 14 in an efficient path. For example, with reference to FIG. 4, user 58 can be directed along the path 104 symbolized by dashed lines so as to move sequentially through shelves 102 of establishment 14. Items on the shopping list can be printed out in an order in which they will be encountered when user 58 travels efficient path 104. The optimized shopping list can also offer specials pertaining to items on the list.

To further enhance the efficiency of the user's shopping experience, the method can include the additional step of sensing the location of the portable terminal 40 with the position-sensing module 90. This position presumably corresponds to the position of user 58 within the shopping establishment 14. In this case, the method can include the additional step of communicating a message advising the user 58 when the user 58 has deviated from the efficient path 104. This message could be generated by wireless communication from host computer 16 to portable terminal 40, or could be generated otherwise; for example, within terminal 40 in response to downloaded information regarding location of goods. Still referring to FIG. 4, when user 58 embarks upon an inefficient path 106, symbolized by dash-dotted lines, a message can be sent to the user 58 to indicate that he or she should traverse the one of the shelves 102 which would have been missed in taking inefficient path 106. More preferably, the list can be reoptimized with new directions based on the user's new location. The communicating step can optionally include an audible communication using speaker 88 of portable terminal 40. One of the previously-discussed keys on portable terminal 40 can be programmed as an interactive marketing help key to alert shopping establishment personnel to the customer's location.

Memory 46 and control module 94 of portable terminal 40 can be suitably programmed such that memory 46 remembers the fifty (for example) most frequently purchased products of the user. These fifty most frequently purchased goods or services (or any other desired number) can be stored in the memory 46 as, for example, a "customer preference file" and can be updated on a continuous basis as the user's preferences change. Further, the user can also have the capability of generating a custom list of frequently-ordered or other desired items. Price and other information associated with the frequent items can be updated, for example, whenever portable terminal 40 is in communication with host computer 16. Different lists can be maintained for each of a variety of shopping establishments. Further, customer preference files can be uploaded to host 16 at any convenient time, e.g., automatically whenever terminal 40 and host 16 communicate (downloads, to update price (for example) could also be performed at this time). Many of a wide variety of customer preferences could be stored (e.g., vegetarian, health food). Additional details on database management are provided in the aforementioned U.S. patent application Ser. No. 08/866,690 the disclosure of which has been previously incorporated herein by reference.

The aforementioned verification queries can include, for example, final price and confirmation of the user's order including price, delivery or pick-up, and desired time. While this information can be sent by voice to telephone 100, it can instead be sent in written form to display 72 of portable terminal 40, or to separate home computer 68, in order to save time for the user. In an aternative embodiment, voice confirmation of a customer's order sections, order instructions, charge information and totals are provided in a system employing standard DTMF signals, e.g, 16 DTMF signals, to communicated with the store host to place the order. The system may also be used to provide prizes in order to promoted the use of the system, i.e., interactive trivia associated with product discounts.

The storing step of the method can include storing data pertaining to a given shopping establishment, and can include the additional steps of repeating the reading step for items associated with another given shopping establishment, and repeating the storing step for the items associated with the other given shopping establishment, such that multiple lists of item for at least two different shopping establishments are stored in the personal terminal.

It will be appreciated that shopping establishment 14 could be, for example, a retail store or a warehouse. Telephone lines 22, 38 can be employed for dual tone multi frequency (DTMF) communication among any of the components of the system. As noted, the phone lines 22, 38 can be public or private.

The user can scan the bar codes of shopping-related items 44 in home 12 all at one time, or as items are used up and thrown away. When ordering from home, the consumer can order just the goods scanned, or can edit information in memory 46 of terminal 40 to customize the order. Portable terminal 40 can then be placed in the portable terminal-receiving station 32 of home cradle 30. Before this placement, as noted above, a shopping-related item 44 containing a special bar code with information about an establishment from which the order is to be placed can be scanned. This could be a card with a bar code and there could be separate cards for each given shopping establishment, such as the drug store, flower shop, grocery store, auto parts store, etc. The card for each of these locations could also include an identification and/or password. As noted, the identification could also be permanently stored in portable terminal 40. For a portable terminal 40 with no display, such as, e.g., 40', editing can be carried out with terminal 40' docked in home cradle 30' via interaction with home computer 68. Separate files for each of a number of shopping establishments can be created in the memory 46 of portable terminal 40. Memory 46 can thus be configured to store multiple lists of data associated with the bar codes, as multiple shopping lists corresponding to multiple shopping establishments. Communication with the appropriate shopping establishment can be indicated by first "swiping" the id card for that shopping establishment. Other files in the memory would not be affected (e.g. florist file not affected by auto parts order).

Once the user has scanned the appropriate card for the given location where the order is to be placed, portable terminal 40 is placed in home cradle 30 and cradle 30 then "dials up" the appropriate shopping establishment 14. At this time, if desired, the user can also pick up the handset of telephone 100. Portable terminal 40 can download the entire shopping list to the host computer 16 at once, or can send one item at a time. In the item-by-item mode, the host computer 16 can respond to each item with a digitized voice setting forth the quantity of the item to be ordered and its description and size, and can then prompt the user to, for example, push the pound sign (on the telephone keypad) to confirm or the star sign to enter another number. This can be repeated until the entire shopping list is downloaded to host computer 16. Further, host computer 16 can also prompt the user to enter the desired delivery time, complete a survey, and the like via the key pad of telephone 100. This interaction could also instead be carried out using the display 72 of portable terminal 40 or using the home computer 68.

When the user instead wishes to travel to shopping establishment 14 to shop, they can dock the portable terminal 40 in the kiosk cradle 24. The appropriate shopping list in memory 46 is then downloaded and stored in the database in host computer 16. As noted in the discussion of the method, the user can print the hard copy of the order and check items off with an ink pen as they are scanned with portable terminal 40 and deposited in, for example, a shopping cart of the user. Again as noted, the list can be imported as an electronic list with items automatically checked off as they are scanned, as discussed above. Further, the aforementioned optimized shopping list, either in electronic or hard copy form, can be generated. It should be noted that the user can be provided with the option to scan additional items not on the list, for example, in response to impulse purchases and the like.

When the position-sensing module is employed, the message sent to the user could be as specific as prompting the user to go back to a given shelf and to remind them which product on that shelf they forgot to purchase.

Once the user has finished picking up the items they wished in shopping establishment 14, they can be "checked out" at one of the point of sale check out terminals 56 in a manner similar to current computer-aided shopping systems. That is, they can present the computerized list and simply tender payment, with occasional auditing to ensure integrity of the system. The shopping list can be up-loaded to terminal 56 and prnted.

The present invention can also be employed by store personnel who are picking a home-placed order which is already in the database of host computer 16. An appropriate billing transaction can then be completed at any point in time by any associate in the shopping establishment 14, whether it be when the user comes to pick up the order, or before or after the order is shipped to the user.

The herein described embodiments of the present invention are intended to provide the preferred embodiments of the present invention as currently contemplated by the applicants. It would be obvious to any one of skill in the relevant art based on the herein described examples without straying from the present invention that numerous modifications could be made to the described preferred embodiments. Accordingly, the herein described embodiments are merely exemplary in nature and are not intended to represent every possible embodiment of the present invention.

What is claimed is:

1. A personal shopping system for combined use in both a home of a user and at least one shopping establishment, said system comprising:
   (a) a host computer;
   (b) a host modem coupled to said host computer;
   (c) at least one shopping establishment kiosk cradle coupled to said host computer, said at least one shopping establishment kiosk cradle in turn comprising:
      a kiosk portable terminal-receiving station; and
      a kiosk data interface associated with said kiosk portable terminal-receiving station;
   (d) a home cradle associated with the home of the user, said home cradle in turn comprising:
      a home portable terminal-receiving station;
      a home data interface associated with said home portable terminal-receiving station; and
      a home data transfer circuit, said home data transfer circuit being coupled to said home data interface for data exchange therewith, said home data transfer circuit being configured for data exchange with said host modem; and
   (e) a portable terminal, said portable terminal in turn comprising:
      a memory for storing data associated with bar codes which are in turn associated with items related to shopping; and
      a two-way terminal data interface coupled to said memory, said terminal data interface being configured for data exchange with said kiosk data interface when said portable terminal is received in said kiosk portable terminal-receiving station, said terminal data interface being configured for data exchange with said home data interface when said portable terminal is received in said home portable terminal-receiving station, said terminal data interface being configured for reading the bar codes associated with the items related to shopping;
   wherein:
      said home data transfer circuit supplies said host computer with the data associated with the bar codes when said portable terminal is received in said home portable terminal-receiving station;
      said shopping establishment kiosk cradle accepts the data associated with the bar codes from said portable terminal through said kiosk data interface and said terminal data interface when said portable terminal is received in said kiosk portable terminal-receiving station, and then downloads the data associated with the bar codes to said host computer; and
      said host computer receives the data associated with the bar codes and stores the data in a shopping list database.

2. The personal shopping system of claim 1, further comprising at least one point-of-sale checkout terminal associated with the shopping establishment and coupled to said host computer.

3. The personal shopping system of claim 1, wherein said portable terminal further comprises intrinsic identifying indicia to identify the user to said host computer.

4. The personal shopping system of claim 1, wherein said home data transfer circuit comprises an interface card for coupling said home cradle to a separate home personal computer and home modem, which in turn communicate with said host modem.

5. The personal shopping system of claim 1, wherein said home data transfer circuit comprises a home modem which communicates with said host modem.

6. The personal shopping system of claim 1, wherein said portable terminal further comprises:
   a display for displaying information to the user; and
   a plurality of control keys for permitting the user to interact with the display.

7. The personal shopping system of claim 1, wherein:
   said portable terminal further comprises an elongate pen-shaping housing having an end with an optically transparent passage therethrough, said memory and said two-way terminal data interface being arranged in said housing with said two-way terminal data interface positioned for data communication through said transparent passage.

8. The personal shopping system of claim 1, further comprising at least one wireless multi-access point associated with the shopping establishment and coupled to said host computer, wherein said portable terminal further comprises:
   a wireless transceiver coupled to said memory and configured for wireless communication with said at least one wireless multi-access point; and
   a position-sensing module which senses position of the user within the shopping establishment and which enables communication with the user when the user has deviated from an optimal shopping path in the shopping establishment.

9. A personal shopping system home station adapted for use with a personal shopping system in turn adapted for use in both a home of a user and at least one shopping establishment, the personal shopping system including a host computer coupled to a host modem, the personal shopping system also including a shopping establishment kiosk cradle having a kiosk portable terminal-receiving station and a kiosk data interface, said home station comprising:
   (a) a home cradle associated with the home of the user and adapted to remain therein, said home cradle in turn comprising:
      a home portable terminal-receiving station;
      a home data interface associated with said home portable terminal-receiving station; and
      a home data transfer circuit, said home data transfer circuit being coupled to said home data interface for data exchange therewith, said home data transfer circuit being configured for data exchange with the host modem; and
   (b) a portable terminal which is portable between the home of the user and the at least one shopping establishment, said portable terminal in turn comprising:
      a memory for storing data associated with bar codes which are in turn associated with items related to shopping; and
      a two-way terminal data interface coupled to said memory, said terminal data interface being configured for data exchange with said kiosk data interface when said portable terminal is received in said kiosk portable terminal-receiving station, said terminal data interface being configured for data exchange with said home data interface when said portable terminal is received in said home portable terminal-receiving station, said terminal data interface being configured for reading the bar codes associated with the items related to shopping;

wherein:

said home data transfer circuit supplies the host computer with the data associated with the bar codes when said portable terminal is received in said home portable terminal-receiving station;

the shopping establishment kiosk cradle accepts the data associated with the bar codes from said portable terminal through the kiosk data interface and said terminal data interface when said portable terminal is received in the kiosk portable terminal-receiving station, and then downloads the data associated with the bar codes to the host computer; and the host computer receives the data associated with the bar codes and stores the data in a shopping list database.

10. The personal shopping system home station of claim 9, wherein said portable terminal further comprises intrinsic identifying indicia to identify the user to the host computer.

11. The personal shopping system home station of claim 9, wherein said home data transfer circuit comprises an interface card for coupling said home cradle to a separate home personal computer and home modem, which in turn communicate with the host modem.

12. The personal shopping system home station of claim 9, wherein said home data transfer circuit comprises a home modem which communicates with the host modem.

13. The personal shopping system home station of claim 9, wherein said portable terminal further comprises:

a display for displaying information to the user; and a plurality of control keys for permitting the user to interact with the display.

14. The personal shopping system home station of claim 9, wherein:

said portable terminal further comprises an elongate pen-shaping housing having an end with an optically transparent passage therethrough, said memory and said two-way terminal data interface being arranged in said housing with said two-way terminal data interface positioned for data communication through said transparent passage.

15. The personal shopping system home station of claim 9, adapted for use with a personal shopping system which has at least one wireless multi-access point associated with the shopping establishment and coupled to the host computer, wherein said portable terminal further comprises:

a wireless transceiver coupled to said memory and configured for wireless communication with the at least one wireless multi-access point; and a position-sensing module which senses position of the user within the shopping establishment and which enables communication with the user when the user has deviated from an optimal shopping path in the shopping establishment.

16. A personal shopping system portable terminal adapted for use with a personal shopping system which is in turn adapted for use in both a home of a user and at least one shopping establishment, the personal shopping system including a host computer coupled to a host modem, the personal shopping system also including a shopping establishment kiosk cradle coupled to the host computer and having a kiosk portable terminal-receiving station and a kiosk data interface, the personal shopping system further including a home cradle having a home portable terminal-receiving station and a home data interface, said personal shopping system portable terminal comprising:

a memory for storing data associated with bar codes which are in turn associated with items related to shopping;

a two-way terminal data interface coupled to said memory, said terminal data interface being configured for data exchange with said kiosk data interface when said portable terminal is received in said kiosk portable terminal-receiving station, said terminal data interface being configured for data exchange with said home data interface when said portable terminal is received in said home portable terminal-receiving station, said terminal data interface being configured for reading the bar codes associated with the items related to shopping; and intrinsic identifying indicia, contained in said portable terminal, to identify the user to the host computer;

wherein:

said home data transfer circuit supplies the host computer with the data associated with the bar codes when said portable terminal is received in the home portable terminal-receiving station;

the shopping establishment kiosk cradle accepts the data associated with the bar codes from said portable terminal through the kiosk data interface and said terminal data interface when said portable terminal is received in the kiosk portable terminal-receiving station, and then downloads the data associated with the bar codes to the host computer; and the host computer receives the data associated with the bar codes and stores the data in a shopping list database.

17. The personal shopping system portable terminal of claim 16, wherein said memory is configured to store multiple lists of data associated with the bar codes, as multiple shopping lists corresponding to multiple shopping establishments.

18. The personal shopping system portable terminal of claim 16, wherein said portable terminal further comprises:

a display for displaying information to the user; and a plurality of control keys for permitting the user to interact with the display.

19. The personal shopping system portable terminal of claim 16, wherein:

said portable terminal further comprises an elongate pen-shaping housing having an end with an optically transparent passage therethrough, said memory and said two-way terminal data interface being arranged in said housing with said two-way terminal optical interface positioned for optical communication through said transparent passage.

20. The personal shopping system portable terminal of claim 16, adapted for use with a personal shopping system which has at least one wireless multi-access point associated with the shopping establishment and coupled to the host computer, said portable terminal further comprising:

a wireless transceiver coupled to said memory and configured for wireless communication with the at least one wireless multi-access point; and a position-sensing module which senses position of the user within the shopping establishment and which enables communication with the user when the user has deviated from an optimal shopping path in the shopping establishment.

21. A method of placing an order for items including at least one of goods and services, said method comprising the steps of:
    reading bar codes associated with the items with a two-way terminal data interface of a portable terminal;
    storing data associated with the bar codes in a memory of said portable terminal;
    transferring the data associated with the bar codes to a host computer for storage in a shopping list database, said transferring step including the sub-steps of:
        transferring the data associated with the bar codes from said memory of said portable terminal to said two-way terminal data interface of said portable terminal;
        transferring the data associated with the bar codes from said two-way terminal data interface to a data interface of one of:
            a kiosk portable terminal-receiving station of a shopping establishment kiosk cradle which is coupled to said host computer; and
            a home portable terminal-receiving station of a home cradle associated with a home of a user, said home cradle being coupled to said host computer;
    and then transferring the data to said host computer; and
    transmitting identifying indicia to said host computer to identify the user to the host computer.

22. The method of claim 21, wherein said transmitting step comprises transmitting intrinsic identifying indicia, contained in said portable terminal, from said portable terminal to said host computer to identify the user to the host computer.

23. The method of claim 21, wherein the data associated with the bar codes is transferred to said data interface of said home portable terminal-receiving station, said method further comprising the additional steps of:
    reading a bar code associated with a shopping establishment with said two-way terminal data interface of said portable terminal; and
    automatically contacting the shopping establishment when said portable terminal is placed in said home portable terminal-receiving station of said home cradle, on the basis of information encoded in the bar code associated with the shopping establishment.

24. The method of claim 21, further comprising the additional step of displaying relevant portions of said shopping list database on a display of said portable terminal.

25. The method of claim 21, wherein the data associated with the bar codes is transferred to said data interface of said home portable terminal-receiving station, further comprising the additional step of sending at least one verification query from said host computer to said home cradle to verify at least one of correctness and validity of an order which is based on said shopping list database.

26. The method of claim 25, wherein said step of sending said verification query includes sending said verification query as a human language audible query to a telephone which is coupled to said home cradle.

27. The method of claim 25, wherein said step of sending said verification query includes sending said verification query as a signal which triggers visual display of verification information on said portable terminal.

28. The method of claim 25, wherein said step of sending said verification query includes verifying caller ID of a telephone number associated with said home portable terminal-receiving station.

29. The method of claim 21, wherein:
    the data associated with the bar codes is transferred to said data interface of said home portable terminal-receiving station; and
    the data associated with the bar codes is transferred from said home portable terminal-receiving station, through an interface card, to a separate home personal computer of the user, and then through a home modem to said host computer;
    said method further comprising the additional steps of:
        sending at least one verification query from said host computer to the separate home computer; and
        responding to said at least one verification query with at least one response emanating from the separate home computer.

30. The method of claim 21, wherein the data associated with the bar codes is transferred to said data interface of said kiosk portable terminal-receiving station, said method further comprising the additional step of printing a hard copy shopping list from said kiosk cradle in response to the data associated with the bar codes.

31. The method of claim 21, wherein the data associated with the bar codes is transferred to said data interface of said kiosk portable terminal-receiving station, said method further comprising the additional steps of:
    scanning new items required to be purchased, in the shopping establishment, with said portable terminal; and
    updating an electronic list in said memory of said portable terminal to indicate that a given one of the new items has been obtained.

32. The method of claim 31, wherein said step of updating said electronic list comprises the step of periodically replacing said portable terminal within said kiosk portable-terminal receiving station.

33. The method of claim 21, wherein the data associated with the bar codes is transferred to said data interface of said kiosk portable terminal-receiving station, said method further comprising the additional step of producing an optimized shopping list for the user in response to:
    said shopping list database; and
    information, contained in said host computer, about locations of the items within the shopping establishment;
    said optimized shopping list being ordered to direct the user through the shopping establishment in an efficient path.

34. The method of claim 21, further comprising the additional steps of:
    generating an optimized shopping list which is ordered to direct the user through the shopping establishment in an efficient path;
    sensing location of said portable terminal, and thus of the user, within the shopping establishment; and
    communicating a message to the user when the user has deviated from the efficient path.

35. The method of claim 21, wherein said storing step includes storing data pertaining to a given shopping establishment, further comprising the additional steps of:
    repeating said reading step for items associated with another given shopping establishment; and
    repeating said storing step for said items associated with said another given shopping establishment;
    whereby multiple lists of items for at least two different shopping establishments are stored in said portable terminal.

* * * * *